US006873426B1

(12) United States Patent
Farrell

(10) Patent No.: US 6,873,426 B1
(45) Date of Patent: Mar. 29, 2005

(54) METHOD AND APPARATUS TO PROVIDE ALTERNATE OR ABSTRACT FINISHING TO A PRINT JOB

(75) Inventor: Michael E. Farrell, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/443,677

(22) Filed: Nov. 19, 1999

(51) Int. Cl.[7] ........................ B65H 43/00; B65H 39/00; G06K 15/00

(52) U.S. Cl. .................... 358/1.15; 358/1.9; 270/52.02; 270/58.01; 270/59; 270/58.31

(58) Field of Search ................. 358/1.1–1.9, 1.11–1.18, 358/468; 355/112; 270/1.01, 1.02, 4, 8, 9, 5.02, 5.03, 20.1, 21.1, 1.03, 37, 53.02, 58.01, 59, 58.11–58.18, 58.31–58.34; 700/124, 220; 101/37, 40, 40.1, 53, 117, 118, 128.21, 224–228, 236–238, 240, 276, 278, 279

(56) References Cited

U.S. PATENT DOCUMENTS 4,987,447 A * 1/1991 Ojha ........................... 399/84
5,126,858 A * 6/1992 Kurogane ................... 358/450
5,129,639 A * 7/1992 DeHority ................... 370/1.01
5,229,814 A * 7/1993 Hube et al. ................... 399/14
5,283,752 A * 2/1994 Gombault et al. .......... 700/221
5,704,602 A 1/1998 Taylor et al. .............. 270/1.02
5,715,381 A 2/1998 Hamilton ................... 358/1.15
5,782,466 A 7/1998 Regimbal et al. ........ 270/58.08
5,822,506 A * 10/1998 Chen et al. ................ 358/1.15
5,918,879 A 7/1999 Steinhilber .................. 271/279
6,249,716 B1 * 6/2001 Edens et al. ................ 700/222

* cited by examiner

*Primary Examiner*—King Y. Poon
(74) *Attorney, Agent, or Firm*—Fay, Sharpe, Fagan, Minnich & McKee, LLP

(57) ABSTRACT

A printing system alternately provides both literal finishing and abstract finishing to a print job. The printing system includes a user interface for supplying print job information including desired finishing instructions. A finishing element is also provided which applies a finishing operation to a print job, and a processor is in communication with both the user interface and the finishing element. The processor determines compatibility between the finishing element and the desired finishing instruction and upon determining incompatibility, selects a compatible finishing instruction for the finishing element. The compatible finishing instruction may be either a literal finishing operation available on the printing system, or an abstract finishing operation. Abstract finishing operations include insertion of slipsheets and/or marking separators between compilation boundaries of a print job with data including machine-readable code or human-readable code indicative of the desired final finishing operation.

10 Claims, 3 Drawing Sheets

METHOD AND APPARATUS TO PROVIDE ALTERNATE OR ABSTRACT FINISHING TO A PRINT JOB

BACKGROUND OF THE INVENTION

The present invention relates to the printing arts. It finds particular application in conjunction with applying finishing instructions to a particular print job, and will be described with particular reference thereto. However, it is to be appreciated that the present invention is also amenable to other like applications where a need exists to dynamically substitute alternate handling instructions and/or associate machine or human-readable instructions with individual print jobs at compilation boundaries or other locations.

Various methods have long been used to prepare printed material in a final or finished state for a user of the material. Such finishing techniques include folding, binding, stapling, excess paper trimming, hole drilling and the like. In earlier times, and in many print shops today, the printing and the finishing steps were accomplished independent of each other. In such cases, the completed print jobs, consisting of a plurality of discrete groups of associated output sheets, are typically marked with a file or other identifier used to alert a finishing operator to the desired finishing for the print job.

Increasingly today printers are fitted with finishing terminals capable of providing a limited selection of finishing capabilities. Use of these printers can reduce the number of steps needed, i.e. the number of machines to which the print job must be transported, to complete a particular job. However, the desired finishing characteristics of the print job can sometimes lead to selection of a specific printer or reprographic device used to do the print job without consideration of that printer's capabilities apart from finishing. In other words, at times, the desired finished output determines the selection of the printer to be used instead of the printer being selected for its reprographic characteristics. This can lead to inefficient resource allocation where a high volume printer, for example, may be selected for a low volume print job, solely because of the finishing terminal attached to the high volume printer.

Indeed, a requested finishing capability may be unavailable on a particular printer/finisher machine thus delaying the print job, or the desired finishing may not be offered by a particular printer. These exemplary situations can delay the total throughput of a particular print shop in general and can delay a specific print job in particular. Accordingly, a need exists to easily modify print jobs to utilize alternate finishing instructions or off line finishing equipment.

The present invention contemplates a new and improved method and apparatus to allow finishing substitution which overcomes the above referenced problems and others.

SUMMARY OF THE INVENTION

In accordance with one aspect of the present invention, a method of finish processing a set of output media includes receiving a first finishing instruction corresponding to a first finishing operation associated with a set of output media. Based on a determination to process the set of output media by other than the first finishing operation, a second finishing instruction is substituted which corresponds to a second finishing operation. The substitution could occur at the printer or in an intermediate point, such as at a network print server.

In accordance with another aspect of the present invention, the method further includes applying the second finishing operation to the set of output media.

In accordance with another aspect of the present invention, the method further includes determining unavailability of the first finishing operation, and selecting a substitute finishing instruction associated with an available finishing operation.

In accordance with another aspect of the present invention, the second finishing operation is selected from a collating process, a registration process (such as edge-aligned stacking, offset stacking and the like), a binding process, a cutting process, a hole forming or drilling process, and an abstract finishing process.

In accordance with another aspect of the present invention, the applying step includes placing a slipsheet relative to the set of output media indicative of where and what finishing operation is to be performed. The slipsheet may be placed prior to the first sheet of a compilation or following the last sheet of a compilation.

In accordance with another aspect of the present invention, the applying step further includes marking the slipsheet with information including the first finishing instruction.

In accordance with another aspect of the present invention, the applying step includes marking the slipsheet with a human-readable and/or machine-readable description of the first finishing instruction.

In accordance with another aspect of the present invention, the applying step includes marking on the set of output media information including the first finishing instruction. The output media is marked on an oversized margin which is viewable by a later finish operator and trimmed off as part of the finishing operation.

In accordance with another embodiment of the present invention, a method of processing a print job using abstract finishing includes receiving a print job including desired finishing instructions. A marker is then generated representing at least one of the desired finishing instructions. The marker is then placed at a selected location relative to the print job. The marker may be a physical addition to the compilation or notation on the printed job.

In accordance with another aspect of the present invention, the generating step includes converting the desired finishing instruction into a human-readable description and/or a machine-readable description of the desired finishing instruction.

In accordance with another aspect of the present invention, individual output media include a printed area and an excess border area. The marker is then placed in the excess border area.

In accordance with another aspect of the present invention, where the desired finishing instruction includes inserting additional insert media at a selected location within the print job, and the placing step includes inserting the marker as a placeholder for the additional insert media.

In accordance with another aspect of the present invention, the placing step includes inserting a marker at compilation boundaries within the print job.

In accordance with another embodiment of the present invention, a printing system includes a user interface for supplying the printing system with data including a desired finishing instruction. A finishing element is also provided which applies a finishing operation to a print job. A processor in communication with both the user interface and the finishing element determines compatibility between the finishing element and the desired finishing instruction. Upon a determination of incompatibility, a compatible finishing instruction for the finishing element is then selected.

In accordance with another aspect of the present invention, the processor substitutes the selected compatible finishing instruction for the desired finishing instruction automatically, in response to stored user defaults, or in response to a query to the user.

One advantage of the present invention resides in increased output integrity from performing the finishing programming substitution automatically, thus eliminating the risk of human error during the reprogramming operation.

Another advantage of the present invention resides in the preservation of the finishing intent of the job submittor.

Still another advantage of the present invention resides in an increase in print shop productivity resulting from minimal operator input or manual operation.

Yet another advantage of the present invention resides in the easy transition from on-line to off-line finishing.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments, and are not to be construed as limiting the invention.

DETAILED DESCRIPTION OF THE PREFERRED EMBODIMENTS

Figure 1:
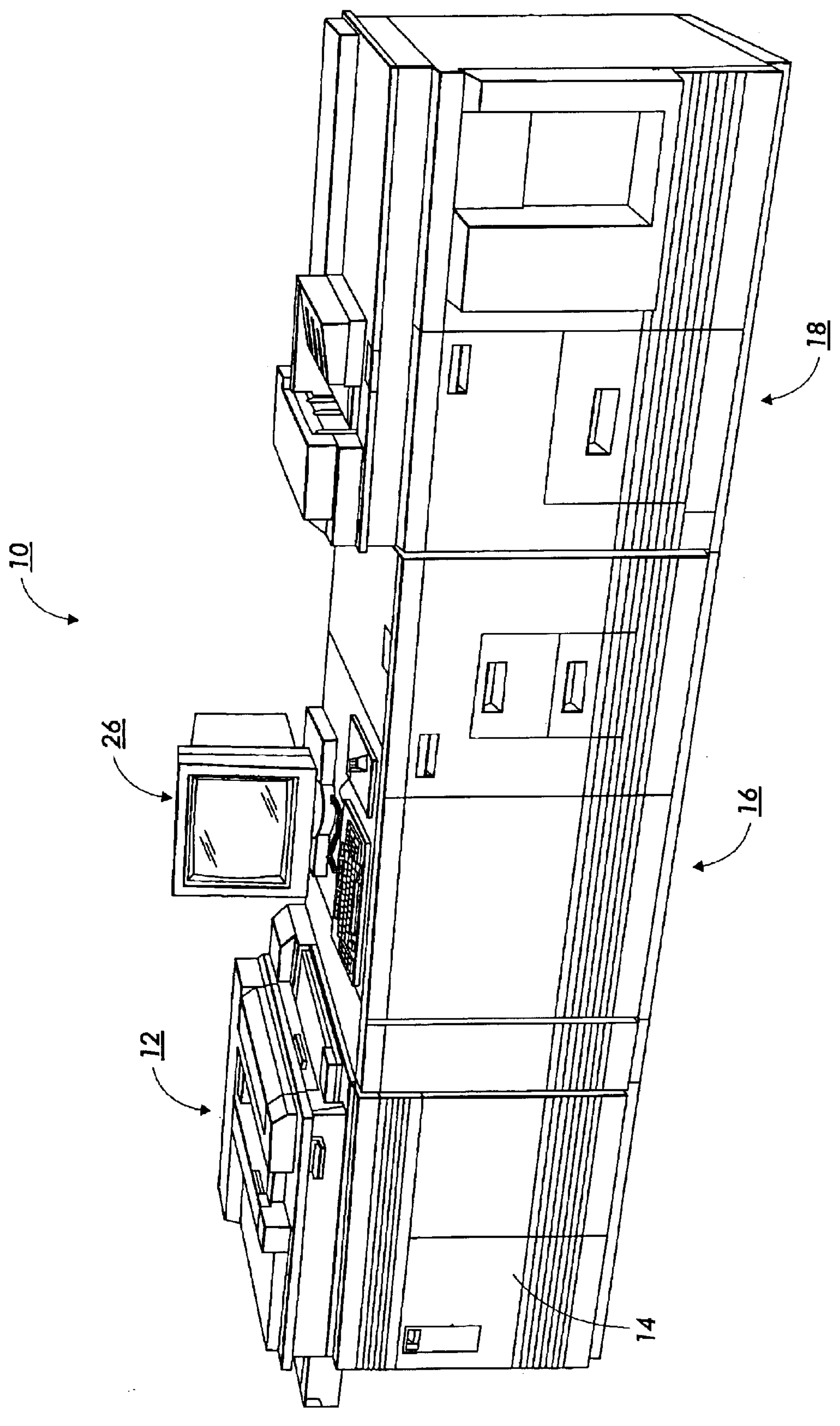
FIG. 1 is a diagrammatic illustration of a printing terminal in accordance with the present invention.

With reference to FIG. 1, an exemplary printing system 10 includes four sections for purposes of explanation. These sections are: an input section 12, a controller section 14, a printer section 16, and finish section 18. While a specific printer system is illustrated in FIG. 1, minor alterations will become apparent to those skilled in the art as the following discussion develops. For example, the input section 12 is illustrated as a typical raster scanner type input, but it is appreciated that input could be provided with equal facility by remote document sources, networked personal computers, and the like. Moreover, while the printing system 10 is illustrated as including a finishing section 18, those skilled in the art will recognize that a dedicated conventional finishing subsystem or element 18 is not required for the purposes of practicing the present invention as will be more fully discussed below.

Figure 2:
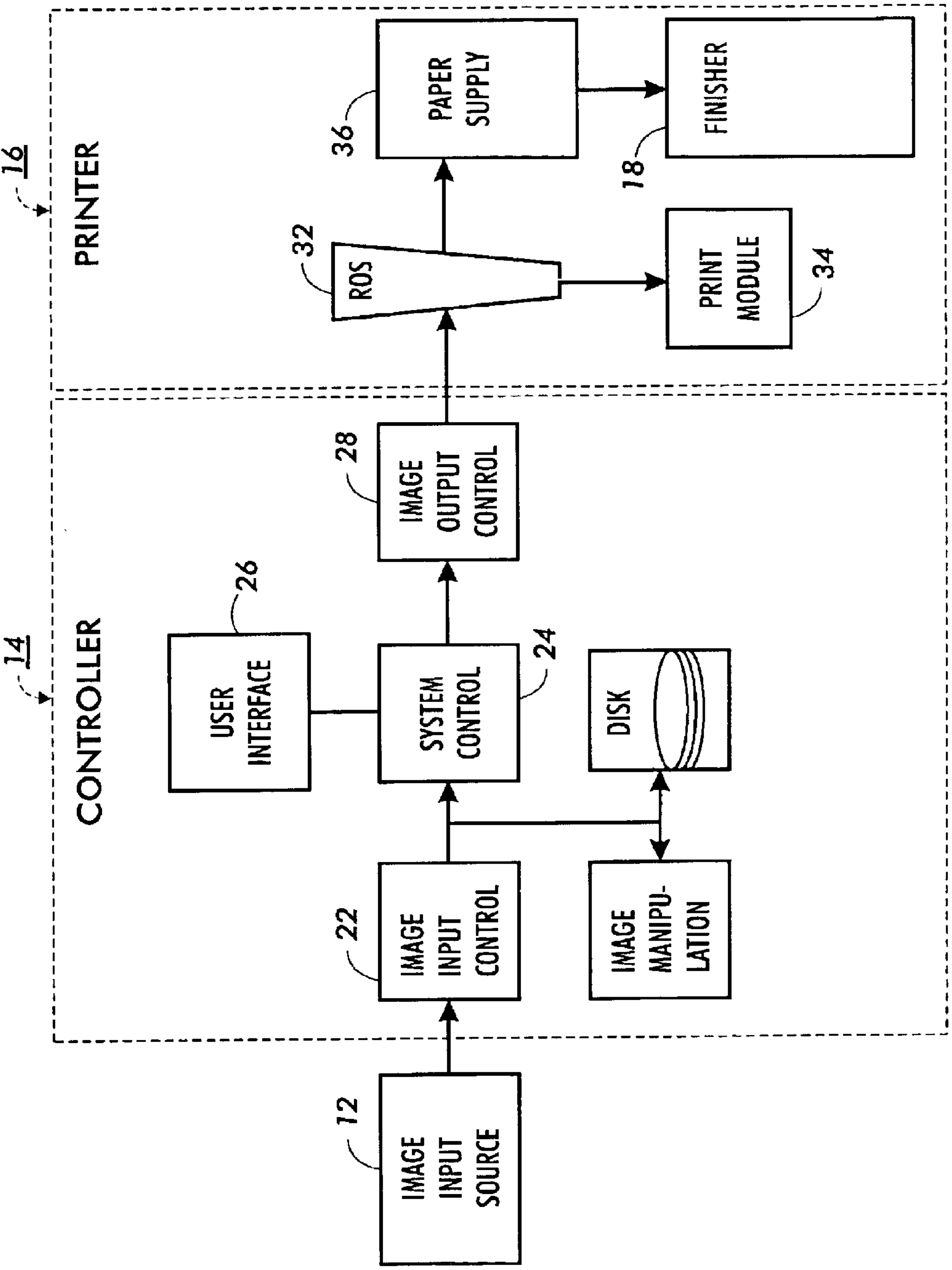
FIG. 2 is a functional block diagram of a portion of the terminal of FIG. 1.

Referring now to FIG. 2, the controller section 14 is illustrated by functional interconnected blocks including an image input control computer 22 for receiving an electronic representation of an image from the image input source 12. A system controller 24 extracts the desired finishing instructions for the particular print job from user interface 26. Typically, users enter preferences such as output media type, orientation, numbers of copies, collation variables, image output quality, and finishing instructions such as binding options, hole drilling, excess margin trimming, and the like. Alternately, user preferences could accompany the job data itself from the image input source 12, for example networked personal computers may be instructed to supply both job data and user preferences. Artisans will appreciate that the controllers decoding the user preferences can be embedded within a single machine, for instance as in an integrated multifunction system; or they can be distributed over a network where, for instance, the input device is not physically packaged with the printer. Regardless of source however, the system controller 24 obtains the desired finishing instructions for the particular print job. Unfortunately, if the finishing element 18 is off line, is in an error state, is not compatible with the desired finishing instruction, or is otherwise unavailable, an error message is typically generated and displayed to a user and the print job is suspended.

However, system controller 24, upon a determination that the desired finishing is unavailable, can substitute alternate finishing instructions which are compatible with available finishing equipment (substitute literal finishing). Additionally, system controller 24 can also employ slipsheets, folders, colored plastics, or annotations in the margins of oversized sheets, and the like (substitute abstract finishing). Regardless of the substitute abstract finishing used, supplying a representation of the desired finishing instructions, either through code or human-readable text, make later off equipment or off site finishing more likely to agree with the originally intended finishing instructions.

With continued reference to FIG. 2, upon a determination to proceed with the print job, the system controller 24 directs an image output controller 28 to synchronize and output the image to the printer section 16. The printer section 16 includes, for example, a laser type printer including a raster output scanner 32 in communication with a print module 34 and a paper supply 36. Upon reaching a compilation boundary, or other appropriate place, the collated plurality of output media are then supplied to the finishing module 18 which applies a finishing operation to the print job such as collating, registration, binding, cutting, hole punching or drilling, and the like. Those skilled in the art may prefer to envision the finishing element 18 as also providing the abstract finishing capabilities in addition to the literal finishing discussed above. In other words, the generation of slipsheets or other markers encoded to represent desired finishing instructions for later application can itself be seen as a finish applied by the finishing element 18.

Figure 3:
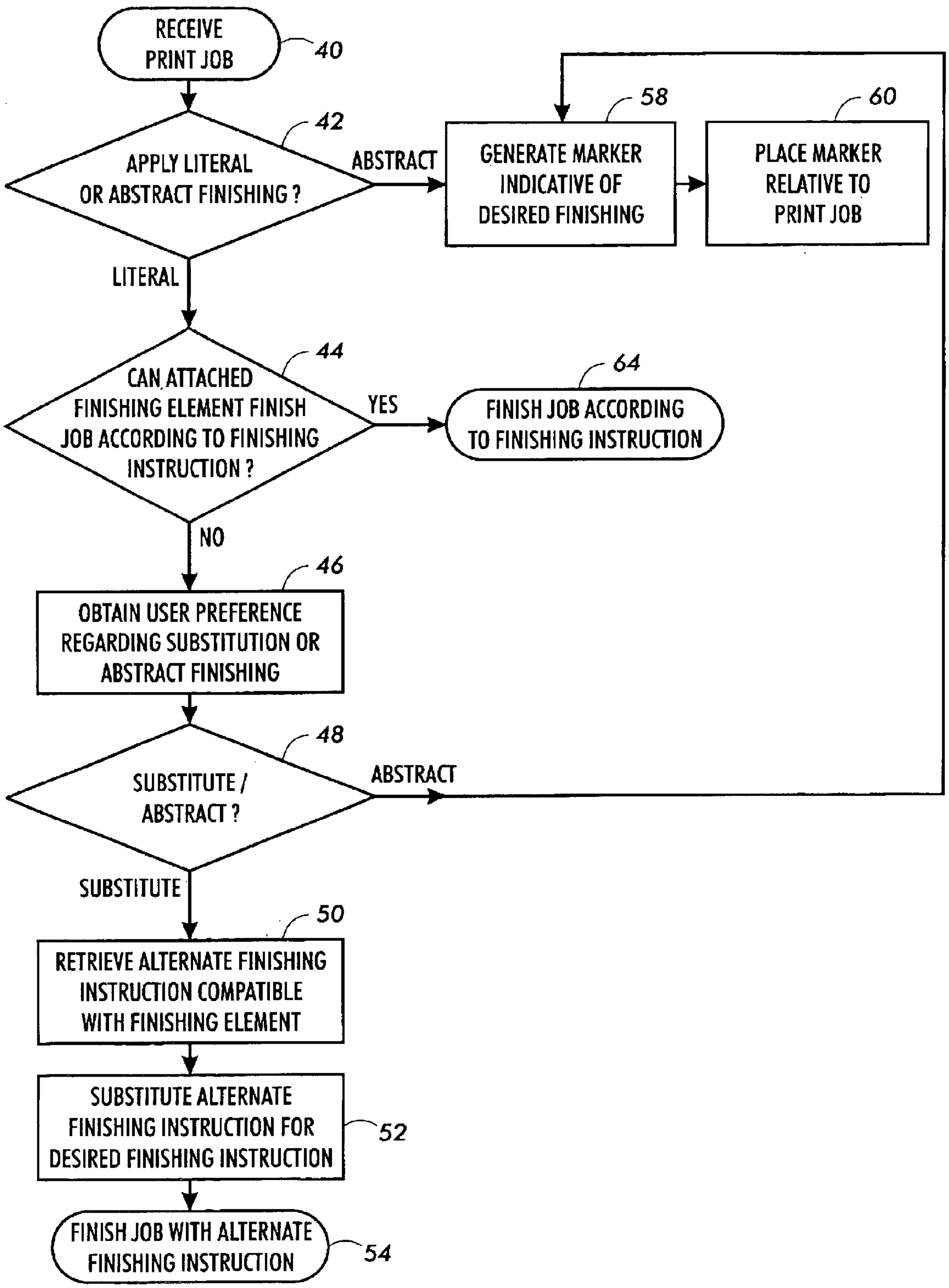
FIG. 3 is a flowchart of a process in accordance with the present invention.

Referring now to FIG. 3, exemplary steps of a finish process suitable to practice the present invention are shown. As discussed above with reference to FIG. 2, the system controller 24 receives a print job from the input device 12, illustrated in block 40. A threshold question can then be answered whether to apply literal or abstract finishing to the print job illustrated by decision block 42. In other words, the present invention envisions a user selecting between either abstract or literal finishing operations at the job onset or during run-time. That is, the job may be prepared with the finishing capabilities existing on the print machine, or with detailed abstract finishing denoting the finishing operation to be later performed. Assuming the job request indicates a preference for literal finishing, for example stapling, the system controller 24 then determines whether the attached finishing element 18 can perform the desired finishing operation, as illustrated by decision block 44. If, to continue the example, stapling is not an option supported by finishing element 18, system controller 24 may then obtain a user preference regarding substitution of the desired finish with an available, literal finish or substituting an abstract finishing operation, as illustrated by block 46. This user preference can take several forms. For example, user preference can be determined from stored or default instructions allowing abstract finishing to be substituted in all cases, or other instructions allowing abstract finishing only when specific literal finishes are unavailable or by querying the user via the user interface. Those skilled in the art will appreciate that providing such a decision to an operator in run time will not significantly inconvenience the operator or slow follow-on print jobs, especially as compared with stopping the print job until user intervention or reprogramming can be accomplished.

In the event substitute finishing is selected from decision block 48, the system controller 24 will retrieve alternate finishing instructions which are compatible with the finishing installed element 18, as illustrated in step 50. The alternate finishing instructions can reside, for example, in the finishing element 18 itself, within a memory in the system 10, or in a networked or otherwise accessible (to controller 24) source. Once the alternate finishing instruction is retrieved, the system controller 24 can substitute the alternate finishing instruction for the entire finishing instruction, as illustrated in step 52. In this case, the print job can be completed with the alternate finishing instruction, executed by the compatible finishing equipment 18 on the print system, as illustrated in step 54.

Referring back to decision block 42, in the event that abstract finishing is selected, a processor such as system controller 24 will generate a marker indicative of the desired finishing to be later applied, as illustrated in step 58. The marker generated may take various forms, such as colored plastic slipsheets inserted at compilation boundaries within the print job, or slipsheets inserted as placeholders at locations requiring a later insert. Additionally, the markers can be configured as machine-readable and/or human readable descriptions of the desired finishing printed on the edge of oversized output media or on pages containing job content, for example, by watermark, glyph, barcode and the like. Once these markers have been generated, they are placed relative to the print job, such as at compilation boundaries, at insert places, as a single finish sheet for an entire job, and the like.

Referring now to decision block 44, if the attached finishing element 18 is compatible with the desired finishing instruction, the print job may proceed conventionally as illustrated in step 64.

Referring now to decision block 48, in the event that a user selects, or that a default is established for abstract finishing in the event of inability to process the desired finishing, a processor, such as system controller 24 will generate the abstract marker as discussed above in conjunction with step 58.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of finish processing a set of output media, comprising:

receiving a first finishing instruction corresponding to a first finishing operation associated with the set of output media; and, based on a determination to process the set of output media by other than the first finishing operation, substituting a second finishing instruction corresponding to a second finishing operation for the first finishing instruction, wherein the second finishing operation is selected from a collating process, a registration process, a binding process, a cutting process, a hole forming process, and an abstract finishing process.

2. A method of finish processing a set of output media, comprising:

receiving a first finishing instruction corresponding to a first finishing operation associated with the set of output media;

based on a determination to process the set of output media by other than the first finishing operation, substituting a second finishing instruction corresponding to a second finishing operation for the first finishing instruction; and, applying the second finishing operation to the set of output media, wherein the applying comprises:

placing a slipsheet relative to the set of output media indicative of where a finishing operation is to be performed; and, marking the slipsheet with information including the first finishing instruction.

3. The method as set forth in claim 2, wherein the marking includes marking the slipsheet with a human-readable description of the first finishing instruction.

4. The method as set forth in claim 2, wherein the marking includes marking the slipsheet with a machine-readable description of the first finishing instruction.

5. A method of finish processing a set of output media, comprising:

receiving a first finishing instruction corresponding to a first finishing operation associated with the set of output media;

based on a determination to process the set of output media by other than the first finishing operation, substituting a second finishing instruction corresponding to a second finishing operation for the first finishing instruction; and, applying the second finishing operation to the set of output media, wherein the applying step comprises marking the set of output media with information including the first finishing instruction.

6. A method of processing a print job using abstract finishing comprising:

receiving the print job including desired finishing instructions;

generating a marker representing at least one of the desired finishing instructions; and, placing the marker at a selected location relative to the print job, wherein the desired finishing instruction includes inserting additional media at a selected location relative to the print job, and the placing step comprises inserting the marker as a placeholder for the additional media.

7. A printing system comprising:

a user interface for supplying the printing system with data including a desired finishing instruction;

a finishing element which applies a finishing operation to a print job; and, a processor in communication with the user interface and the finishing element, said processor determining compatibility between the finishing element and the desired finishing instruction, and upon determining incompatibility, selecting a compatible finishing instruction for the finishing element, wherein said selected compatible finishing instruction is supplied to the finishing element such that the finishing operation includes marking the print job with the desired finishing instruction.

8. The printing system as set forth in claim 7, wherein the processor substitutes the selected compatible finishing instruction for the desired finishing instruction.

9. The printing system as set forth in claim 7, wherein the processor determines user preference regarding the selected compatible finishing instruction.

10. A printing system comprising:

a user interface for supplying the printing system with data including a desired finishing instruction;

a finishing element which applies a finishing operation to a print job; and, a processor in communication with the user interface and the finishing element, said processor determining compatibility between the finishing element and the desired finishing instruction, and upon determining incompatibility, selecting a compatible finishing instruction for the finishing element, wherein the finishing operation applied by the finishing element is selected from a collating process, a registration process, a binding process, a cutting process, a hole forming process, and an abstract finishing process.

* * * * *